(12) United States Patent
Chen et al.

(10) Patent No.: US 11,836,223 B2
(45) Date of Patent: Dec. 5, 2023

(54) SYSTEMS AND METHODS FOR AUTOMATED DETECTION OF BUILDING FOOTPRINTS

(71) Applicant: Meta Platforms, Inc., Menlo Park, CA (US)

(72) Inventors: Li Chen, Fremont, CA (US); Purvi Goel, Fremont, CA (US); Ilknur Kaynar Kabul, Mountain View, CA (US); David Dongzhe Yang, Brighton, MA (US)

(73) Assignee: Meta Platforms, Inc., Menlo Park, CA (US)

( * ) Notice: Subject to any disclaimer, the term of this patent is extended or adjusted under 35 U.S.C. 154(b) by 236 days.

(21) Appl. No.: 17/350,594

(22) Filed: Jun. 17, 2021

(65) Prior Publication Data
US 2022/0156526 A1    May 19, 2022

Related U.S. Application Data

(60) Provisional application No. 63/113,805, filed on Nov. 13, 2020.

(51) Int. Cl.
*G06K 9/62* (2022.01)
*G06K 9/32* (2006.01)
(Continued)

(52) U.S. Cl.
CPC ...... *G06F 18/2185* (2023.01); *G06F 18/2113* (2023.01); *G06F 18/2148* (2023.01); *G06N 3/045* (2023.01); *G06N 3/08* (2013.01); *G06V 10/243* (2022.01); *G06V 10/30* (2022.01); *G06V 20/176* (2022.01)

(58) Field of Classification Search
CPC ............. G06F 18/2185; G06F 18/2148; G06F 18/2113; G06V 10/243; G06V 10/30; G06V 20/176; G06N 3/045; G06N 3/08
See application file for complete search history.

(56) References Cited

PUBLICATIONS

Ahmed et al, "Learning to extract buildings from ultra-high-resolution drone images and noisy labels", Apr. 19, 2020, International Journal of Remote Sensing (22 pages) (Year: 2020).*

(Continued)

*Primary Examiner* — David F Dunphy
(74) *Attorney, Agent, or Firm* — Greenberg Traurig, LLP (57) ABSTRACT

The disclosed computer-implemented method may include collecting a set of labels that label polygons within a training set of images as architectural structures. The method may also include creating a set of noisy labels with a predetermined degree of noise by distorting boundaries of a number of the polygons within the training set of images. Additionally, the method may include simultaneously training two neural networks by applying a co-teaching method to learn from the set of noisy labels. The method may also include extracting a preferential list of training data based on the two trained neural networks. Furthermore, the method may include training a machine learning model with the preferential list of training data. Finally, the method may include identifying one or more building footprints in a target image using the trained machine learning model. Various other methods, systems, and computer-readable media are also disclosed.

20 Claims, 8 Drawing Sheets

(51) Int. Cl.
| | |
|---|---|
| G06K 9/40 | (2006.01) |
| G06K 9/00 | (2022.01) |
| G06N 3/04 | (2023.01) |
| G06N 3/08 | (2023.01) |
| G06F 18/21 | (2023.01) |
| G06V 10/24 | (2022.01) |
| G06V 10/30 | (2022.01) |
| G06V 20/10 | (2022.01) |
| G06F 18/2113 | (2023.01) |
| G06F 18/214 | (2023.01) |
| G06N 3/045 | (2023.01) |

(56) References Cited

PUBLICATIONS

Han et al, "Co-teaching: Robust Training of Deep Neural Networks with Extremely Noisy Labels", 2018, 32nd Conference on Neural Information Processing Systems (NeurIPS 2018), (11 Pages) (Year: 2018).*

Chadwick S., et al., "Training Object Detectors With Noisy Data," IEEE Intelligent Vehicles Symposium (IV), Jun. 9-12, 2019, pp. 1319-1325.

European Search Report for European Application No. 21194869.0, dated Feb. 16, 2022, 5 pages.

Xie Y., et al., "A Locally-Constrained YOLO Framework for Detecting Small and Densely-Distributed Building Footprints," International Journal of Geographical Information Science, vol. 34, No. 4, Jun. 4, 2019, 26 pages.

Han et al., "Co-teaching: Robust Training of Deep Neural Networks with Extremely Noisy Labels", 32nd Conference on Neural Information Processing Systems (NeurIPS), 2018, pp. 1-11.

Inouye et al., "Hyperparameter Selection under Localized Label Noise via Corrupt Validation", Workshop presentation in 31st Conference on Neural Information Processing Systems (NeurIPS), 2017, pp. 1-6.

* cited by examiner

SYSTEMS AND METHODS FOR AUTOMATED DETECTION OF BUILDING FOOTPRINTS

CROSS REFERENCE TO RELATED APPLICATION

This application claims the benefit of U.S. Provisional Application No. 63/113,805, filed 13 Nov. 2020, the disclosure of is incorporated, in their entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Satellite images may be useful for creating maps or for identifying locations on a global scale. For example, users may plan routes for a trip using software applications that identify streets and buildings on an image to calculate distances between two points. Because these applications depend upon accurately identifying constructs within the images, it is crucial to accurately determine the size, location, and shape of these constructs, such as identifying the footprint of a building.

Some conventional methods of processing satellite images rely on user input to help identify and label the constructs within the images. However, these users are often untrained and may mislabel images by mistake, leading to sparse or inaccurate labeling from human annotation. One the other hand, hiring trained users to label the images can still lead to labeling errors and may be costly in terms of both time and money. Additionally, users may disagree on labels or may be undecided due to inherent problems with images, such as misalignment or lack of information or detail within a specific image.

Traditional attempts to automate these labeling processes to overcome user error and lack of domain expertise often have their own problems. Some simple algorithms may be inaccurate in predicting exact shapes of building footprints or may incorrectly label images. Other methods may be more accurate overall but may then struggle to interpret noisy labels or sparse information, leading to poor generalization. For instance, for large-scale datasets, outliers or anomalies may become too simplistic to describe noisy labels, which may skew the results of the predictive model. Thus, better methods of quickly and accurately identifying image constructs, like building footprints, are needed to improve the handling of potential noise in data labels.

The present disclosure is generally directed to systems and methods for automated detection of building footprints. As will be explained in greater detail below, embodiments of the present disclosure may, by manipulating polygons representing building footprints in training images, mimic potential real-world noise such as distortion in images and incorrectly labeled images. By extracting features from noisy images or images containing noisy labels, the systems and methods described herein may ensure that training data simulates label noise so that a resulting model can also handle potential noise. The disclosed systems and methods may then employ a co-teaching method using the simulated noisy data to train two neural networks to improve each other and select better training data from the set of images with noisy labels. Additionally, the disclosed systems and methods may evaluate not only the neural networks but also the training data to rank and identify a preferential list of training data. The disclosed systems and methods may then use the preferred training data to train a machine learning model to more accurately identify building footprints in any given image.

In addition, the systems and methods described herein may improve the functioning of a computing device by improving the speed and accuracy of automated image labeling, particularly for noisy or sparse data. These systems and methods may also improve the fields of image processing and spatial computing by providing a framework to simulate real-world image and label noise through polygon distortion, rather than simply adjusting the probabilities of categorical variables, and by employing co-teaching neural networks to make deep learning more robust. Thus, the disclosed systems and methods may improve over traditional methods of identifying buildings by intentionally distorting training images to create noisy labels that train neural networks to handle noisy training data to more accurately identify building footprints.

Features from any of the embodiments described herein may be used in combination with one another in accordance with the general principles described herein. These and other embodiments, features, and advantages will be more fully understood upon reading the following detailed description in conjunction with the accompanying drawings and claims.

Figure 1:
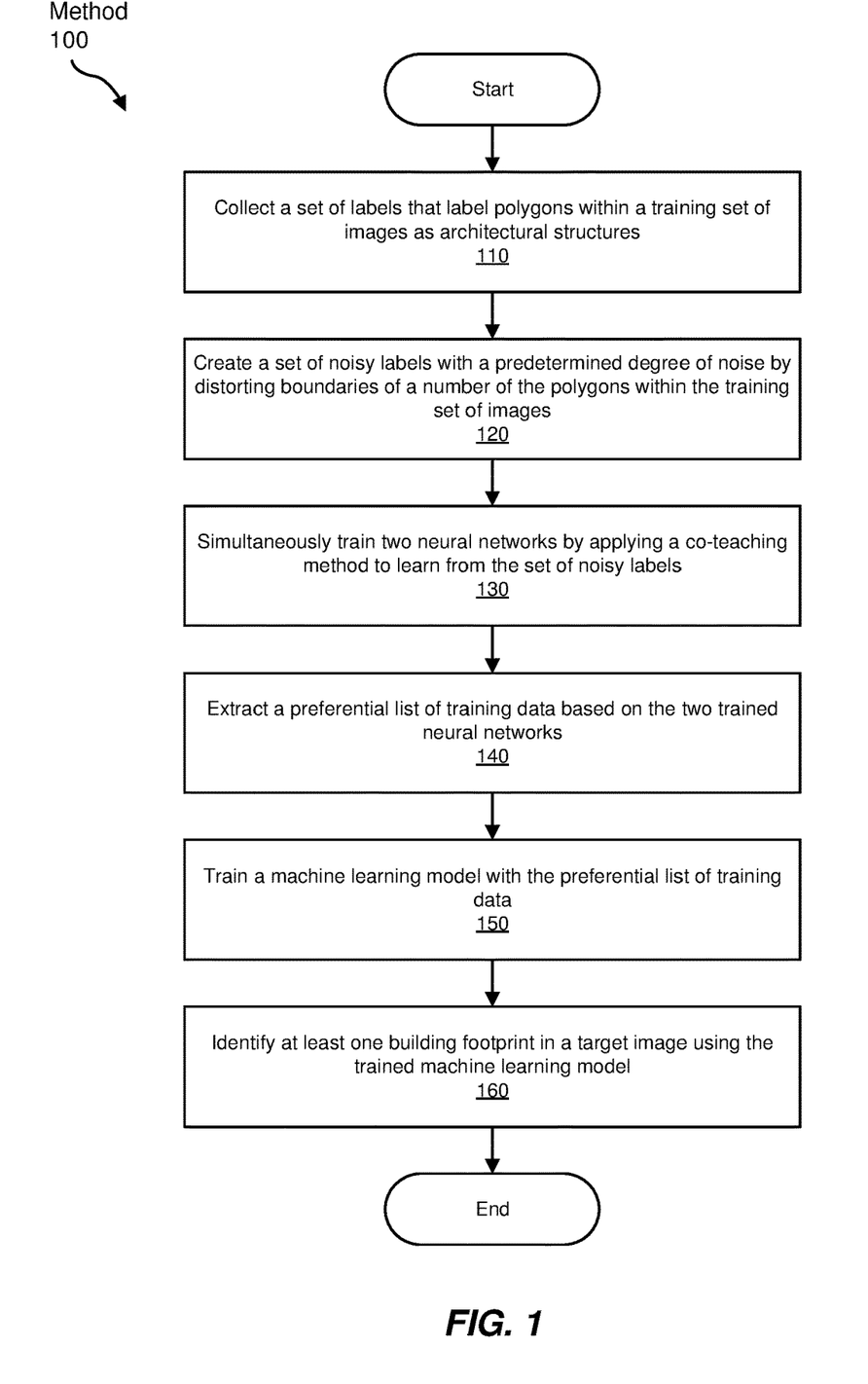
FIG. 1 is a flow diagram of an exemplary method for automated detection of building footprints.

The following will provide, with reference to FIG. 1, detailed descriptions of computer-implemented methods for automated detection of building footprints. Detailed descriptions of a corresponding exemplary system will be provided in connection with FIG. 2. In addition, detailed descriptions of exemplary labels of polygons in exemplary images will be provided in connection with FIGS. 3A-3B. Detailed descriptions of exemplary distortion of polygons in exemplary images used for training labels will be provided in connection with FIGS. 4A-4B. Furthermore, detailed descriptions of an exemplary co-teaching method and an exemplary model for training and evaluating exemplary neural networks for co-teaching will be provided in connection with FIG. 5 and FIG. 6. Detailed descriptions of an exemplary evaluation of label accuracy will also be provided in connection with FIG. 7. Finally, detailed descriptions of an exemplary preferential ranking of exemplary training data will be provided in connection with FIG. 8.

FIG. 1 is a flow diagram of an exemplary computer-implemented method 100 for automated detection of building footprints. The steps shown in FIG. 1 may be performed by any suitable computer-executable code and/or computing system, including system 200 and computing device 202 illustrated in FIG. 2. In one example, each of the steps shown in FIG. 1 may represent an algorithm whose structure includes and/or is represented by multiple sub-steps, examples of which will be provided in greater detail below.

Figure 2:
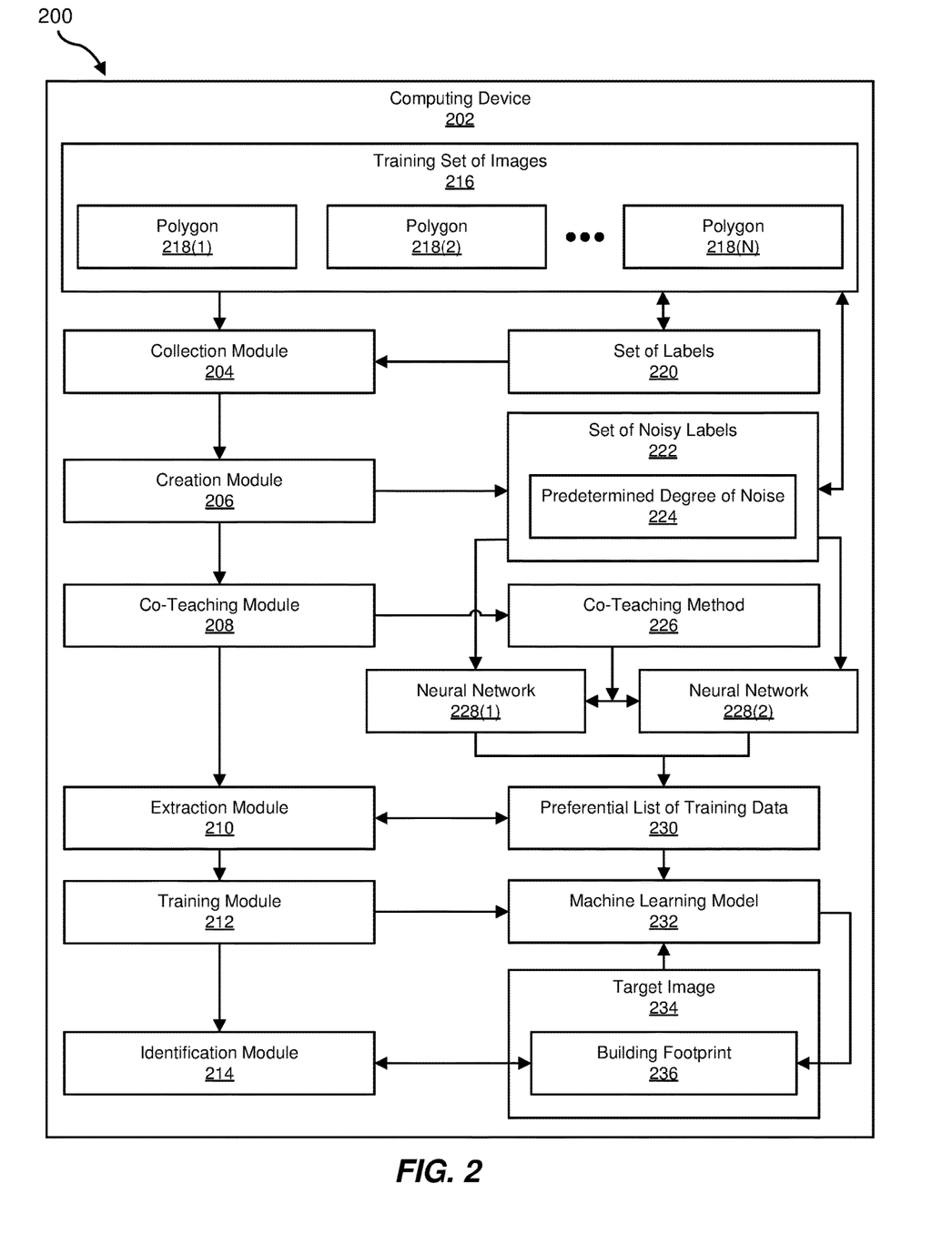
FIG. 2 is a block diagram of an exemplary system for automated detection of building footprints.

As illustrated in FIG. 1, at step 110, one or more of the systems described herein may collect a set of labels that label polygons within a training set of images as architectural structures. For example, FIG. 2 is a block diagram of an exemplary system 200 for automated detection of building footprints. As illustrated in FIG. 2, a collection module 204 may, as part of system 200, collect a set of labels 220 that label polygons 218(1)-(N) within a training set of images 216 as architectural structures.

The systems described herein may perform step 110 in a variety of ways. In one example, system 200 of FIG. 2 may represent one or more computing devices or servers that may be programmed with the modules of FIG. 2 and/or may store all or a portion of the data described herein. For example, system 200 may represent a server that is capable of storing and/or managing image data, such as training set of images 216 and set of labels 220, and may be capable of reading computer-executable instructions. Additional examples of system 200 may include, without limitation, application servers and database servers configured to provide various database services and/or run certain software applications, such as video storage and streaming services.

In some embodiments, a computing device 202 may generally represent any type or form of computing device capable of training models to analyze image data. Examples of computing device 202 may include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, or any other suitable computing device.

Furthermore, in some embodiments, system 200 and/or computing device 202 may be in communication with other computing devices and systems via a wireless or wired network, such as in receiving images from satellite networks and/or collecting labels from remote users. In some examples, the term "network" may refer to any medium or architecture capable of facilitating communication or data transfer. Examples of networks include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), or the like.

In some examples, the terms "training data" and "training set" may refer to data used in machine learning and data mining to create functions and classifiers that may make predictions on additional data, such as predicting labels of building footprints in other images. In some examples, the term "machine learning" may refer to a method to create a computational algorithm that may learn from data in order to make predictions. Examples of machine learning may include, without limitation, support vector machines, neural networks, clustering, decision trees, regression analysis, classification, variations or combinations of one or more of the same, and/or any other suitable supervised, semi-supervised, or unsupervised methods.

In one embodiment, collection module 204 may first collect training set of images 216 and then collect set of labels 220 for the images in training set of images 216. In other embodiments, training set of images 216 may already be labeled, and collection module 204 may identify set of labels 220 that correspond to training set of images 216. In one example, training set of images 216 may represent satellite images depicting geographic areas, which may include views of buildings. In this example, building footprints may be visible as overhead views of the buildings or architectural structures.

In some examples, collection module 204 may collect set of labels 220 by identifying training set of images 216 and collecting crowdsourced labels for images in training set of images 216. In some embodiments, the term "crowdsource" may refer to a process of collecting data from or outsourcing work to a large number of people, such as collecting image labels from a web community. For example, collection module 204 may collect set of labels 220 from an open source resource such as OpenStreetMap (OSM), which crowdsources user labels for building polygons. In this example, each image may represent a tile including one or more building polygons and/or one or more user labels. In other examples, users may label locations based on physical exploration of a geographical area, such as applying a label to a location of a house, a parking garage, a business, and/or other architectural structures.

Figure 3A:
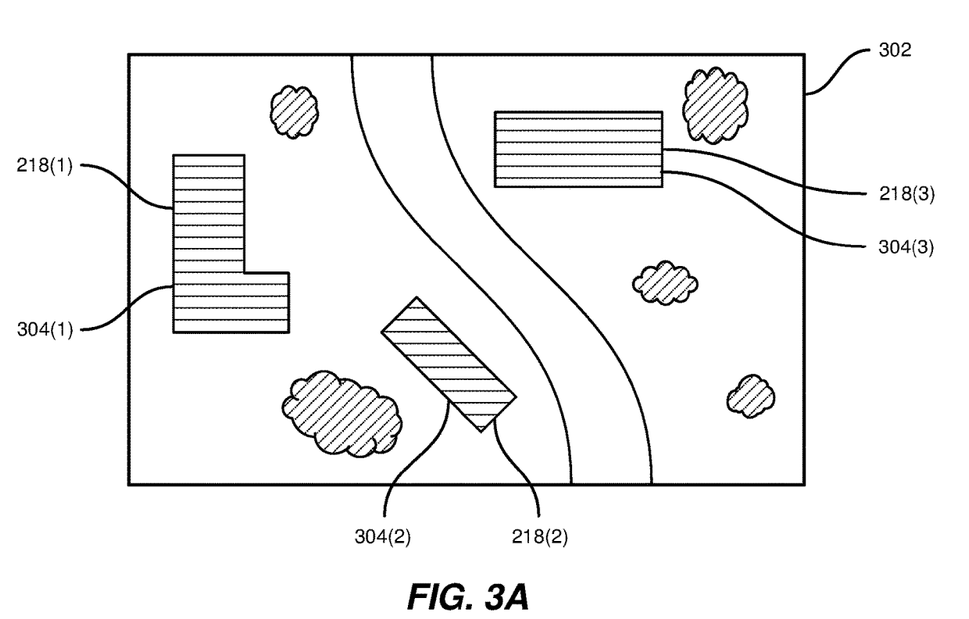
FIGS. 3A-3B illustrate exemplary labels of polygons in exemplary images.
Figure 3B:
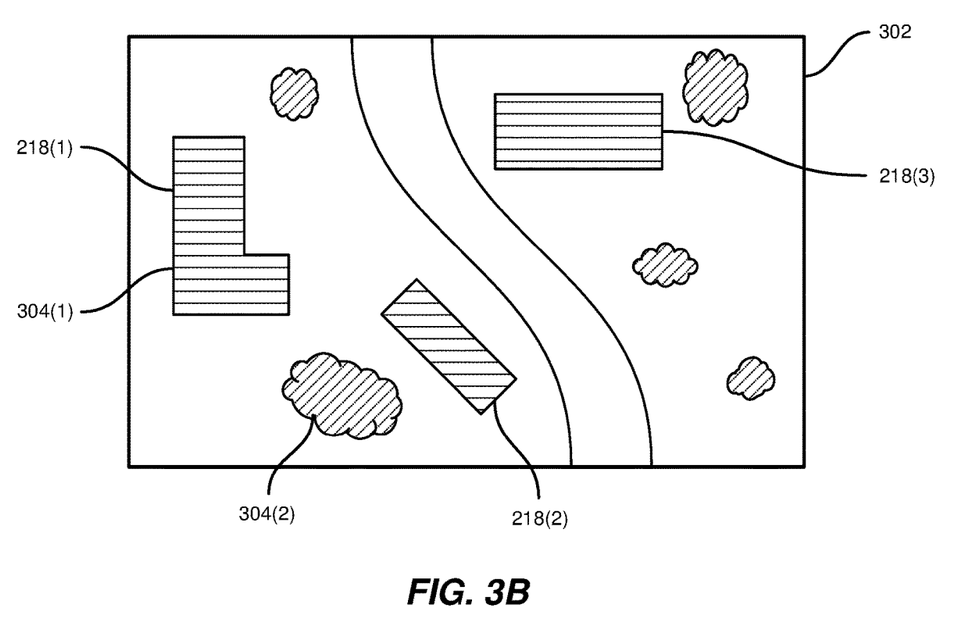

As illustrated in FIG. 3A, an image 302 may include polygons 218(1)-(3). In this example, labels 304(1)-(3) may accurately identify each of polygons 218(1)-(3) as an architectural structure. As illustrated in the alternate example of FIG. 3B, some labels may be inaccurate. In this example, polygon 218(2) and polygon 218(3) may be missing labels, and label 304(2) may be incorrectly applied to an area that does not include a building.

Additionally, in some examples, collection module 204 may collect images or tiles from different countries or geographic regions to provide a diverse set of training images. For example, collection module 204 may limit the number of images collected from each country or region of interest to avoid one region having too much weight compared to others in the dataset.

Returning to FIG. 1, at step 120, one or more of the systems described herein may create a set of noisy labels with a predetermined degree of noise by distorting boundaries of a number of the polygons within the training set of images. For example, a creation module 206 may, as part of computing device 202 in FIG. 2, create a set of noisy labels 222 with a predetermined degree of noise 224 by distorting boundaries of a number of polygons 218(1)-(N) within training set of images 216.

The systems described herein may perform step 120 in a variety of ways. In one embodiment, predetermined degree of noise 224 may include a calculated degree of noise based on crowdsourced labels for a geographic region. For example, creation module 206 may attempt to simulate a level of noise in a real-world setting, such as a percentage of noise calculated from OSM labels for a specific region. In this example, crowdsourced labels may frequently introduce errors into labels, such as in the example of FIG. 3B, and set of noisy labels 222 may mimic crowdsourced errors to provide more accurate training for real-world situations. In another embodiment, predetermined degree of noise 224 may include a manually adjusted degree of noise. For example, creation module 206 may enable a user to flexibly adjust the degree of noise previously simulated to emulate the real-world setting.

In some examples, creation module 206 may distort the boundaries of a polygon by adjusting a scale of the polygon, rotating the polygon, shifting a location of the polygon, and/or skewing a boundary of the polygon. For example, the distorted polygons may represent misaligned images taken from satellite photos or other image errors. In additional examples, creation module 206 may distort the boundaries of multiple polygons based on a desired range of noise.

In some examples, creation module 206 may then create set of noisy labels 222 by applying set of labels 220 to the distorted polygons. In these examples, the resulting noisy polygons and their associated labels may be used as noisy labels to train a machine learning model. Additionally or alternatively, creation module 206 may remove a portion of polygons 218(1)-(N) from training set of images 216 and/or may adjust a distribution of types of polygons within training set of images 216. In these examples, creation module 206 may remove some percentage of polygons to mimic a sparsity of crowdsourced labels or adjust the distribution to mimic a similar distribution of types of polygons in a geographic region.

Figure 4A:
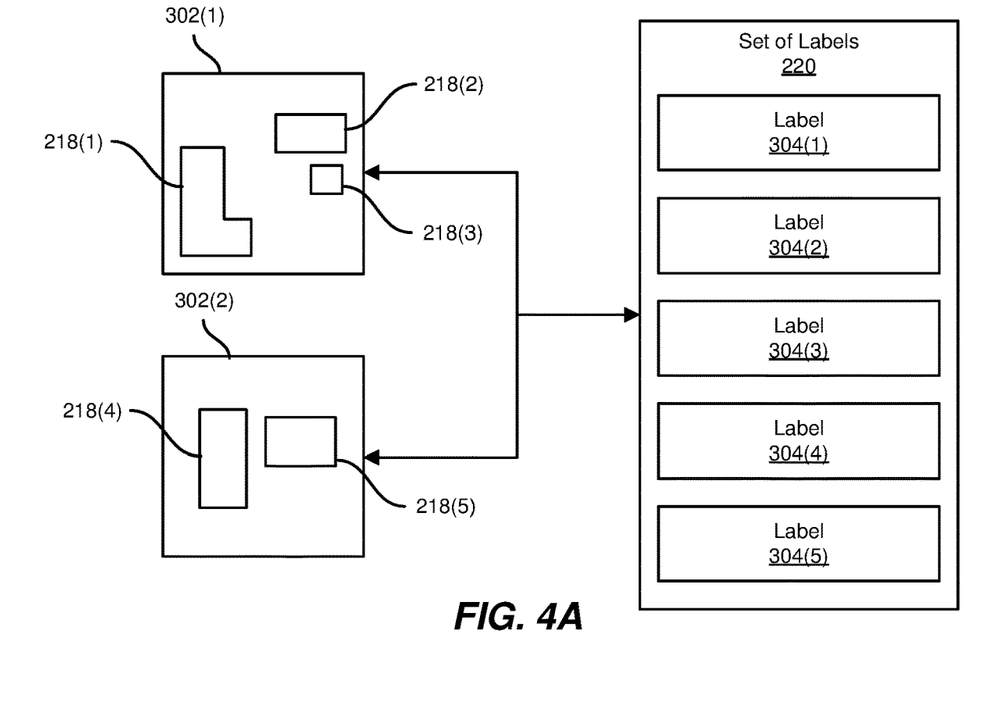
FIGS. 4A-4B illustrate exemplary distortion of polygons in exemplary images used for training labels.
Figure 4B:
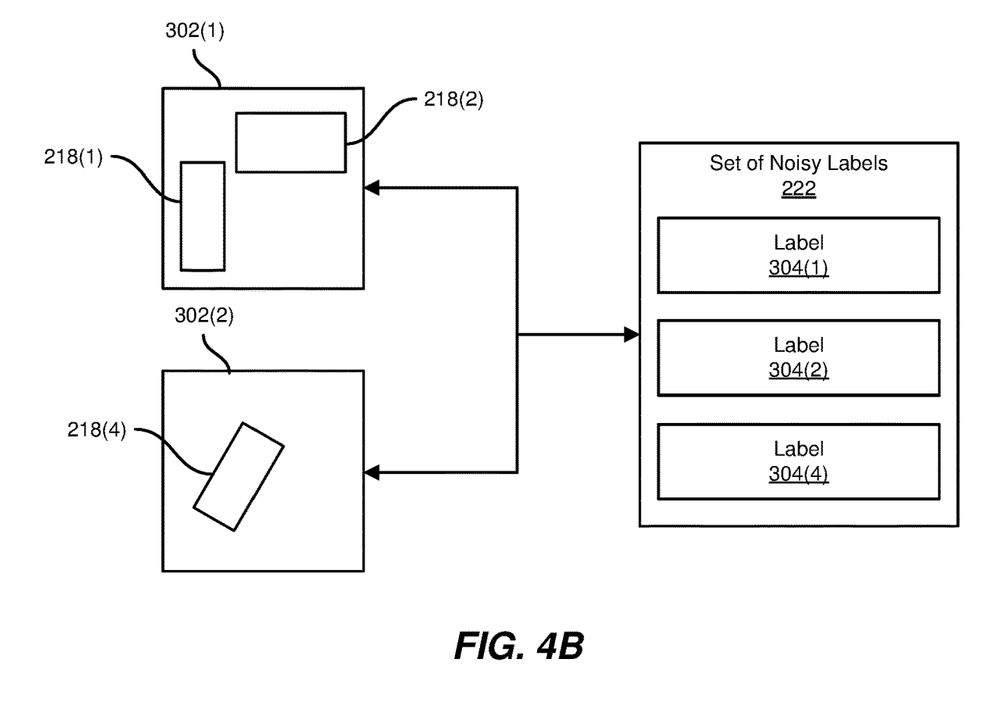

As illustrated in FIG. 4A, an initial set of images 302(1) and 302(2) may include polygons 218(1)-(5) representing building footprints. In this example, accurate set of labels 220 may include labels 304(1)-(5) corresponding to each of polygons 218(1)-(5). In contrast, as illustrated in FIG. 4B, images 302(1) and 302(2) may be distorted to remove polygons 218(3) and 218(5), resulting in the corresponding removal of labels 304(3) and 304(5) from set of labels 220 to produce set of noisy labels 222. Additionally, polygons 218(1), 218(2), and 218(4) may be geometrically perturbed to mimic image distortion, thereby introducing noise to corresponding labels 304(1), 304(2), and 304(4), which may label the pixels of the original building footprints in images 302(1) and 302(2).

Returning to FIG. 1, at step 130, one or more of the systems described herein may simultaneously train two neural networks by applying a co-teaching method to learn from the set of noisy labels. For example, a co-teaching module 208 may, as part of computing device 202 in FIG. 2, simultaneously train neural networks 228(1) and 228(2) by applying a co-teaching method 226 to learn from set of noisy labels 222.

The systems described herein may perform step 130 in a variety of ways. In some embodiments, the term "neural network" may refer to a model of connected data that is weighted based on input data and used to estimate a function. For example, a deep-learning neural network may use unsupervised training of input data to detect features within the data. Examples of neural networks may include artificial neural networks, deep belief neural networks, deep-learning neural networks, convolutional neural networks, and/or other forms of machine learning methods that can learn from data using multiple processing layers to emulate a neural network. For example, the disclosed systems and methods may use feature extraction with a semantic segmentation model to train a convolutional neural network to segment building footprints from satellite images on a global scale. In this example, the term "semantic segmentation" may refer to a process of identifying what is in an image at a pixel level, linking pixels to class labels such as a buildings. In some examples, the term "feature extraction" may refer to a process of deriving features, represented as values or vectors, that can be analyzed as part of machine learning.

In one embodiment, co-teaching module 208 may train neural networks 228(1) and 228(2) by training neural networks 228(1) and 228(2) on embeddings of training set of images 216, updating neural network 228(1) using training data selected by neural network 228(2), and updating neural network 228(2) using training data selected by neural network 228(1). In some examples, the term "co-teaching method" may refer to the use of machine learning models to teach and improve each other over multiple iterations of training. In other words, neural networks 228(1) and 228(2) may each select the best training data currently available at an iteration and feed that training data to the other neural network, which may improve its selection of training data in turn.

In some embodiments, the term "embedding" may refer to a mapping of a categorical variable to a numerical vector, such that the variable may be analyzed numerically. For example, embeddings of categorical polygon labels may be represented by vectors that are closer for polygons that are similar. In some examples, each training image may represent a tile of a set number of pixels, with each pixel representing a set length of ground and labels indicating whether each pixel is part of a building footprint or not. Embeddings of these images may then represent vectors indicating whether a pixel is labeled as a building footprint, which may then be used as training data.

Figure 5:
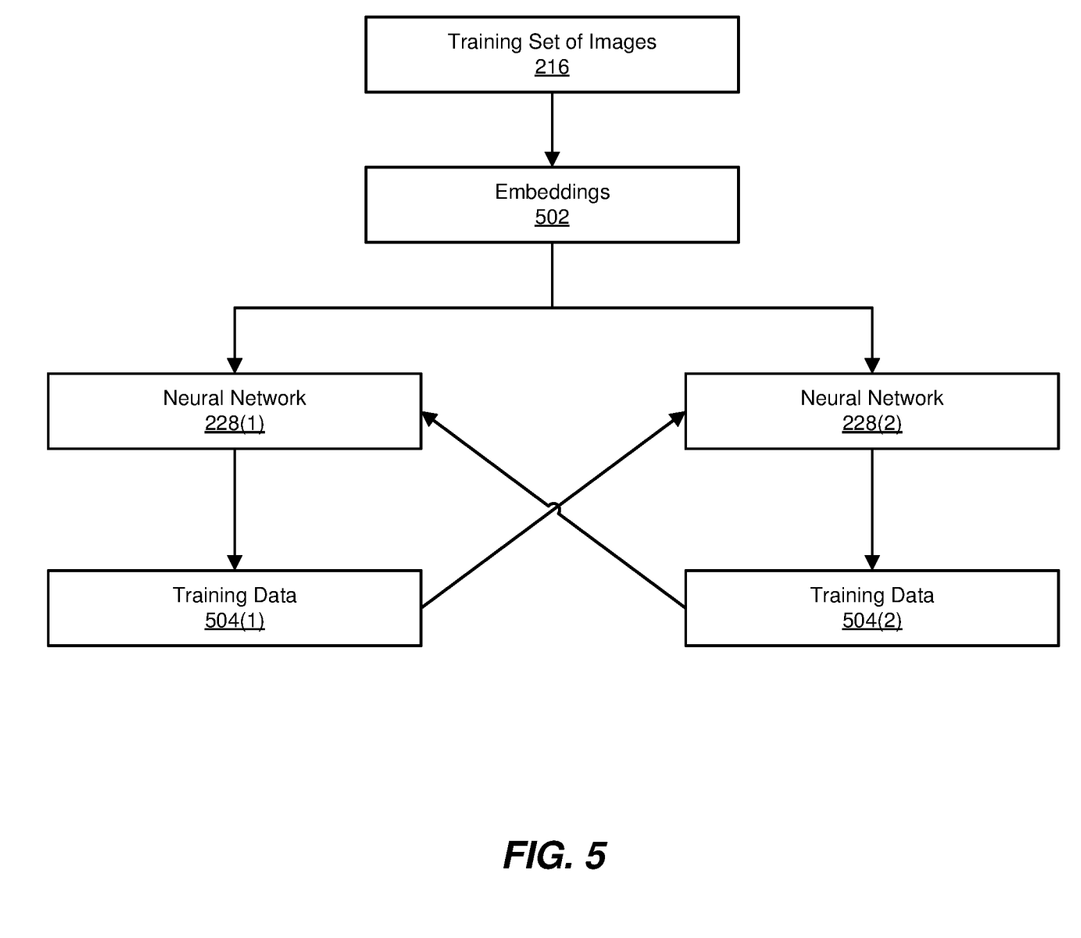
FIG. 5 is a block diagram of an exemplary co-teaching method.
Figure 6:
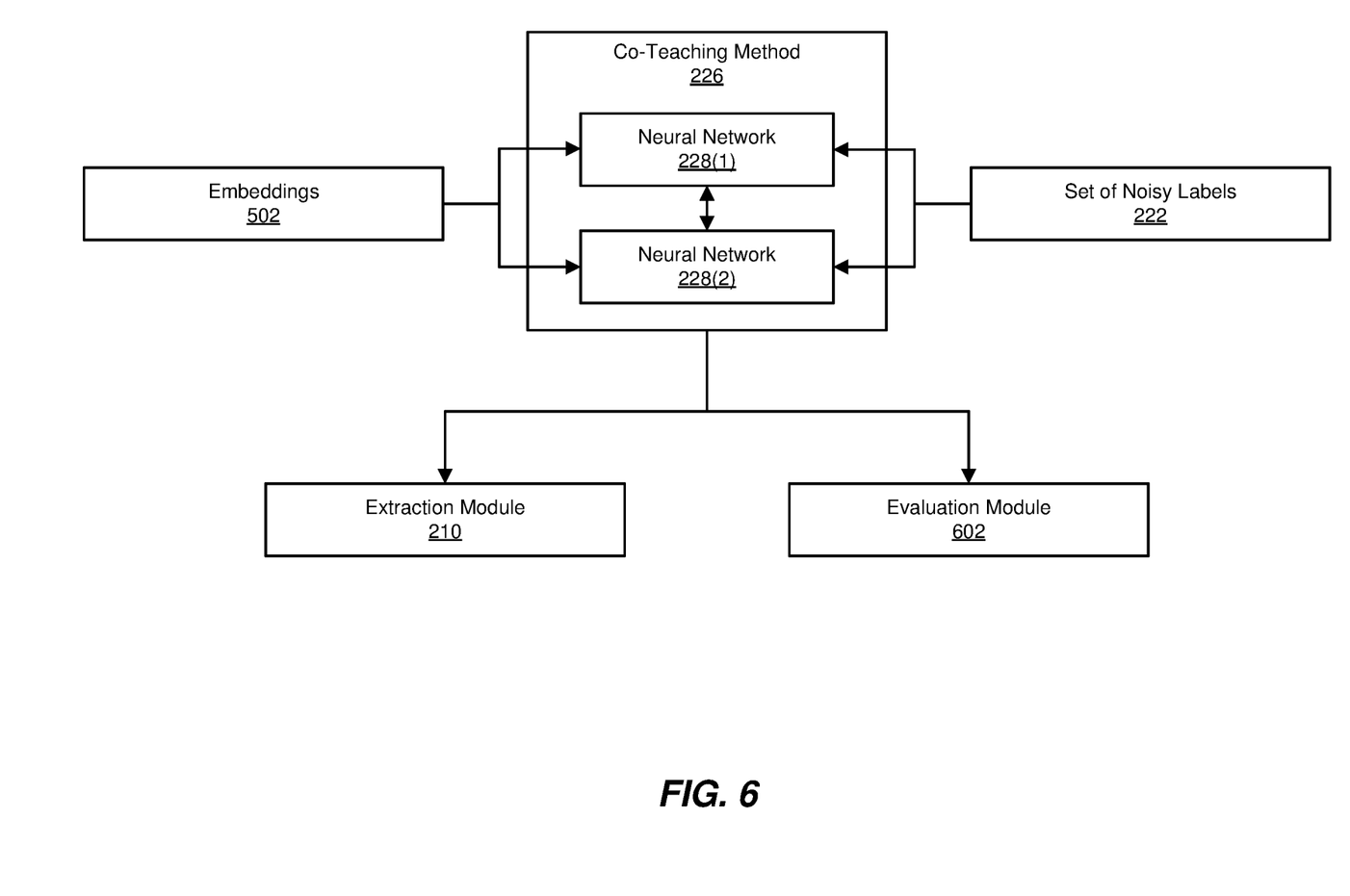
FIG. 6 is a block diagram of an exemplary model for training and evaluating exemplary neural networks for co-teaching.

As illustrated in FIG. 5 and FIG. 6, co-teaching module 208 may first extract embeddings 502 from training set of images 216. In the example of FIG. 6, co-teaching module 208 may then train neural networks 228(1) and 228(2) to select the best training data using embeddings 502 derived from training set of images 216 and using set of noisy labels 222. By using co-teaching method 226 to train neural networks 228(1) and 228(2), co-teaching module 208 may enable neural networks 228(1) and 228(2) to each update with improved training data 504(1) and 504(2), as shown in FIG. 5, selected by the other neural network over multiple iterations. In other words, neural networks 228(1) and 228(2) may train each other with a feed forward mechanism to select better data over time. In some examples, co-teaching module 208 may continue to improve neural networks 228(1) and 228(2) until sequential iterations show minimal improvement or until a user determines a neural network achieves a preferred level of accuracy.

Returning to FIG. 1, at step 140, one or more of the systems described herein may extract a preferential list of training data based on the two trained neural networks. For example, an extraction module 210 may, as part of computing device 202 in FIG. 2, extract a preferential list of training data 230 based on trained neural networks 228(1) and 228(2).

The systems described herein may perform step 140 in a variety of ways. In one embodiment, extraction module 210 may extract preferential list of training data 230 by evaluating an accuracy of labels for training set of images 216 and swapping a low accuracy label with a higher accuracy label. For example, noisy labels may mimic human labeling, and extraction module 210 may replace labels considered too inaccurate with better labels to avoid incorrectly training the machine learning model. In this example, highly inaccurate labels may be swapped with some level of confidence to maintain a clean and filtered training dataset.

Figure 7:
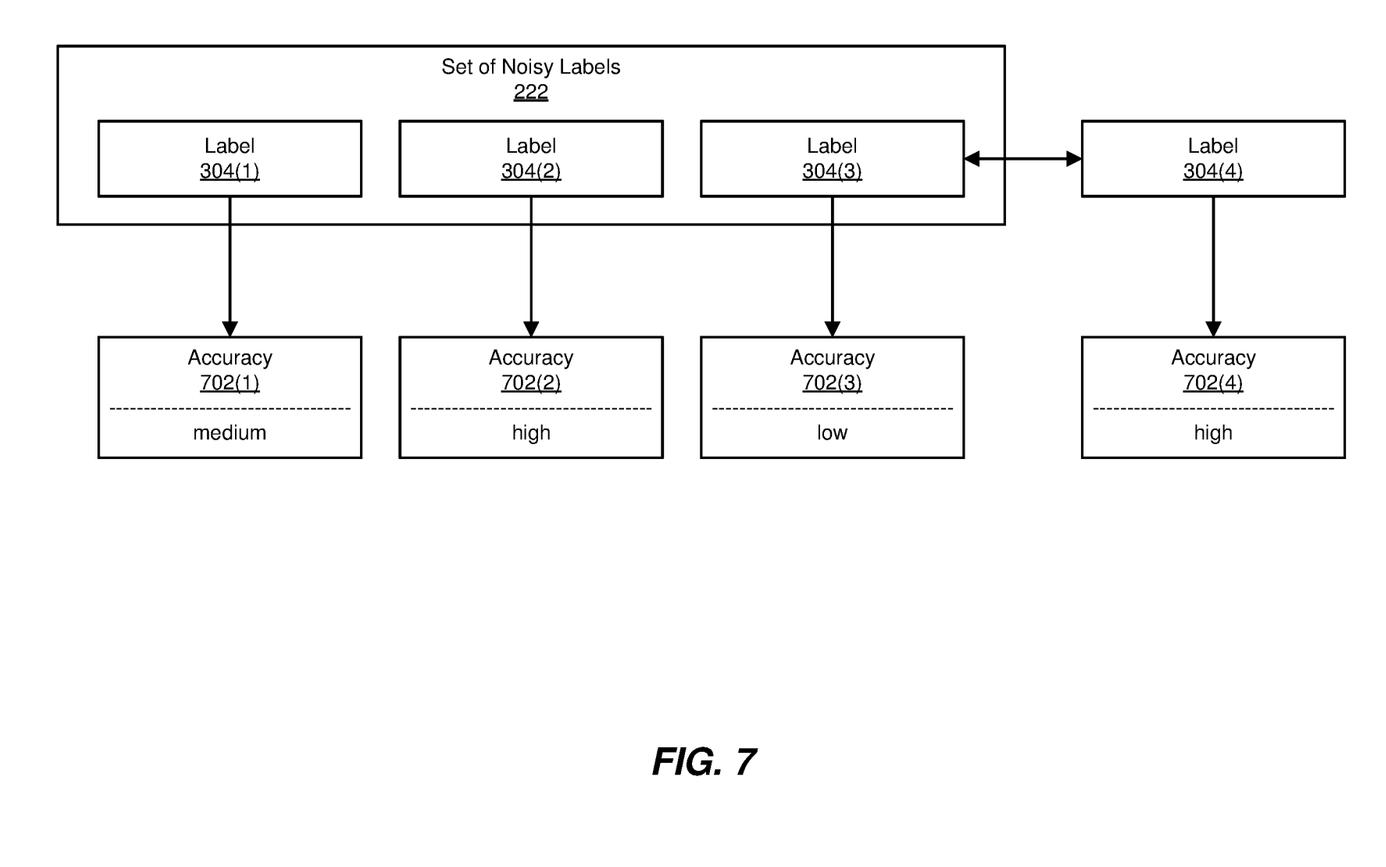
FIG. 7 is a block diagram of an exemplary evaluation of label accuracy.

As illustrated in FIG. 7, set of noisy labels 222 may include labels 304(1)-(3) with varying degrees of accuracy 702(1)-(3). However, in this example, label 304(3) may be determined to fall below a threshold of accuracy, and extraction module 210 may replace label 304(3) with label 304(4) with a high accuracy 702(4) to improve training data that uses set of noisy labels 222. In other examples, extraction module 210 may adjust set of noisy labels 222 to add or remove labels to better correspond to real-world label accuracy.

In some embodiments, extraction module 210 may extract preferential list of training data 230 by ranking training data based on a loss function of co-teaching method 226 and adding training data to preferential list of training data 230 based on the ranking. In some examples, the term "loss function" may refer to a mathematical function that calculates a cost of a set of circumstances. For example, a loss function of a machine learning model may calculate a probability of inaccurate predictions. In these embodiments, extraction module 210 may perform a training data reliability assessment to determine what data is more reliable to use for training a machine learning model. For example, extraction module 210 may rank training images based on a likelihood of accurate corresponding labels and select the highest ranked images as a training dataset.

In some examples, extraction module 210 may extract preferential list of training data 230 by evaluating whether neural network 228(1) and/or neural network 228(2) select a representative sample of training images to use in training the machine learning model. As shown in FIG. 6, extraction module 210 may evaluate training data selected by neural networks 228(1) and 228(2) as a result of co-teaching method 226. In other examples, training data may be ranked to indicate how much the labels of the training data may be trusted, which may contribute to the calculation of the loss function.

Figure 8:
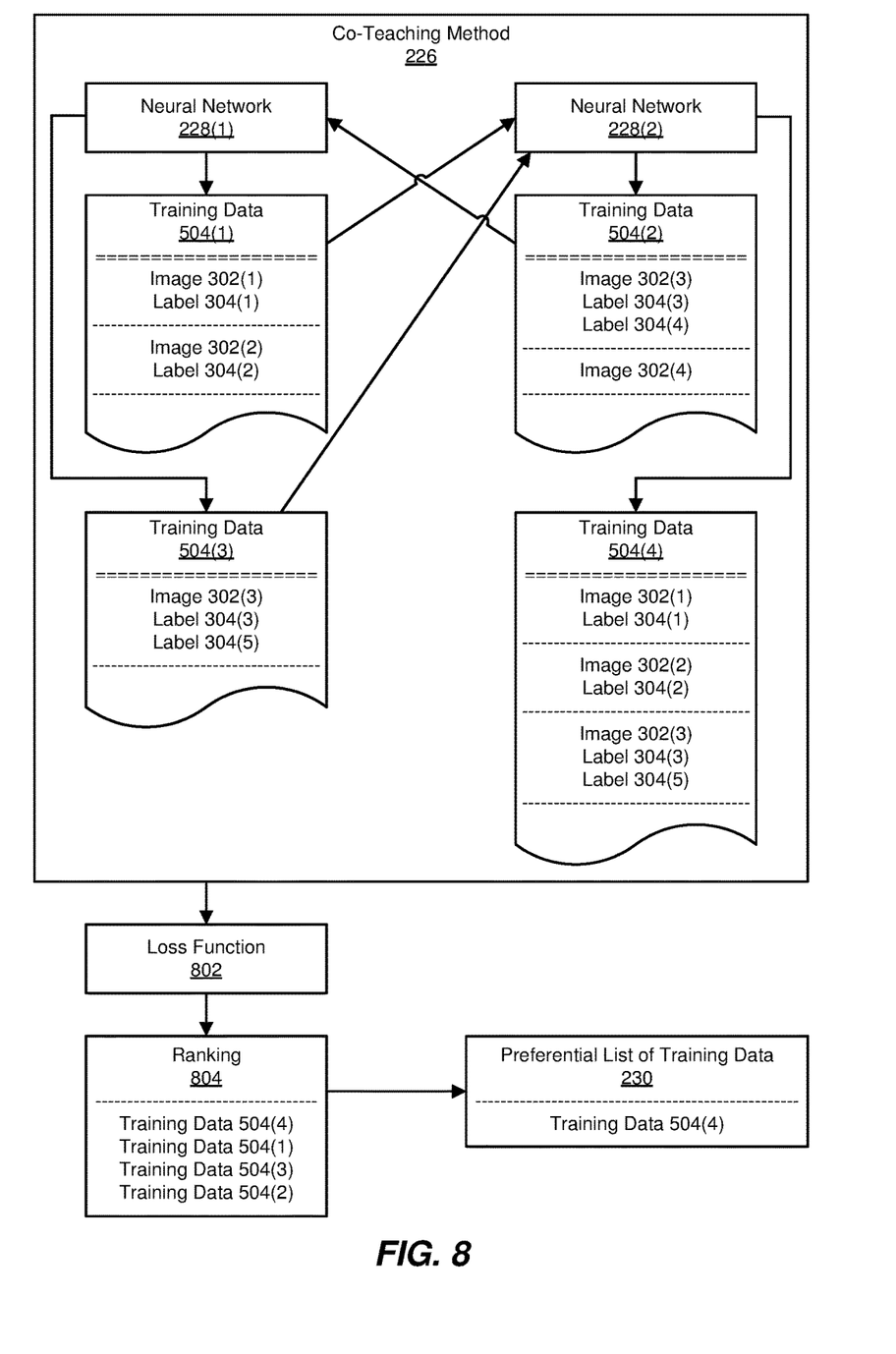
FIG. 8 is a block diagram of an exemplary preferential ranking of exemplary training data.

As illustrated in FIG. 8, co-teaching method 226 may include neural network 228(1) and 228(2) selecting training data 504(1) and 504(2), respectively, from training set of images 216 in an initial iteration. Neural network 228(1) may then feed training data 504(1) to neural network 228(2), and neural network 228(2) may feed training data 504(2) to neural network 228(1). In this example, in an evaluation of training data 504(2), neural network 228(1) may determine that an image 302(4) includes no building polygons or may not be representative of a real-world region of interest and, therefore, may be a poor selection for training. Additionally, neural network 228(1) may determine an alternate label 304(5) provides a more accurate label for an image 302(3) than label 304(4) currently selected by neural network 228(2) in training data 504(2). Thus, neural network 228(1) may refine training data 504(2) into training data 504(3) in a second iteration. Subsequently, neural network 228(2) may determine a combination of training data 504(1) and 504(3) is the most accurate and representative data and, thereby, may output training data 504(4) as a result. Furthermore, in this example, extraction module 210 may use a loss function 802 to create a ranking 804 of training data 504(1)-(4) and, subsequently, may determine training data 504(4) is the highest ranked dataset. Thus, extraction module 210 may use training data 504(4) as preferential list of training data 230. In other examples, extraction module 210 and/or a user may include additional highly ranked training data to provide a more representative sample of images depending on regional attributes.

Returning to FIG. 1, at step 150, one or more of the systems described herein may train a machine learning model with the preferential list of training data. For example, a training module 212 may, as part of computing device 202 in FIG. 2, train a machine learning model 232 with preferential list of training data 230.

The systems described herein may perform step 150 in a variety of ways. In some examples, training module 212 may use preferential list of training data 230, as shown in FIG. 8, based on ranking 804. In one embodiment, training module 212 may incorporate an hourglass model to process features across all scales and image sizes and consolidate the features to best capture the spatial relationships associated with building footprints that the model infers from training images. The hourglass model may repeat bottom-up and top-down processing, such as by perform multiple successive steps of pooling and up-sampling to produce a final set of predictions. In other words, machine learning model 232 may break down images into component parts and/or combine them during training to accurately predict building footprints for various images sizes.

Returning to FIG. 1, at step 160, one or more of the systems described herein may identify one or more building footprints in a target image using the trained machine learning model. For example, an identification module 214 may, as part of computing device 202 in FIG. 2, identify a building footprint 236 in a target image 234 using trained machine learning model 232.

The systems described herein may perform step 160 in a variety of ways. In some embodiments, machine learning model 232 may determine the size and scale of target image 234. In these embodiments, machine learning model 232 may then identify pixels of target image 234 that correspond to building footprint 236. After identifying all building pixels, identification module 214 may combine the pixels to identify a shape of building footprint 236 by identifying the borders of a polygon.

In some examples, the systems and methods described herein may further evaluate a predictive accuracy of the two trained neural networks. For example, an evaluation module 602, as shown in FIG. 6, may represent an additional module of computing device 202 of FIG. 2 and may evaluate the predictive accuracy of neural networks 228(1) and 228(2). Additionally, evaluation module 602 may modify neural network 228(1) and/or neural network 228(2) to improve the predictive accuracy of one or both neural networks.

In one embodiment, evaluation module 602 may evaluate the predictive accuracy of neural networks 228(1) and 228(2) by calculating an intersection over union (IOU) metric calculated for image pixels, a precision score, a recall score, and/or an F-score. In some examples, the term "intersection over union" may refer to a metric for evaluating the accuracy of detecting a particular type of data, such as a building footprint. In some examples, the term "precision score" may refer to a metric of calculating the ratio of accurately identified objects to overall identified objects, such as the number of accurately identified buildings compared to all identified buildings, including inaccurate identifications. In some examples, the term "recall score" may refer to a metric of calculating potentially missed identifications. In some examples, the term "F-score" may refer to a metric to evaluate model accuracy, which may include the use of a precision score and a recall score. For example, an $F_1$ score may equally value precision and recall when evaluating a model. By evaluating the overall accuracy, evaluation module 602 may improve the selection of preferential list of training data 230 used to train machine learning model 232, which may then improve the detection of building footprint 236 in target image 234.

As explained above in connection with method 100 in FIG. 1, the disclosed systems and methods may, by introducing perturbation to directly manipulate polygon geometry, improve the simulation of noise in categorical variables such as labels of building footprints in satellite images. Specifically, the disclosed systems and methods may first collect a set of training images and corresponding labels for building in the images. The disclosed systems and methods may then simulate noisy labels by adjusting the polygons representing buildings in the training images and adjusting the percentages of various types of buildings and labels. For example, the disclosed systems and methods may skew the borders of building footprints or add and remove entire polygons or labels. The systems and methods described herein may subsequently feed the training images and noisy labels to two neural networks that co-teach each other to select the best training data from the available dataset.

Additionally, the systems and methods described herein may use the co-teaching neural networks to evaluate and rank datasets to identify the best training data for classifying images to identify building footprints. By providing a framework to evaluate labels using uncertain estimation, the disclosed systems and methods may provide confidence levels for whether noisy labels generated for the model are useful. For example, labels that are too inaccurate may be swapped for better labels, and various datasets may be ranked to find the best dataset to train a machine learning model. Therefore, by creating noisy labels for deep learning, the disclosed systems and methods may train a more robust machine learning model that can handle label noise to more accurately identify building footprints. Thus, the systems and methods described herein may improve the evaluation of training data as well as train more accurate machine learning models to identify categorical variables in image data that may be highly sparse and noisy.

Example Embodiments

Example 1: A computer-implemented method for automated detection of building footprints may include 1) collecting a set of labels that label polygons within a training set of images as architectural structures, 2) creating a set of noisy labels with a predetermined degree of noise by distorting boundaries of a number of the polygons within the training set of images, 3) simultaneously training two neural networks by applying a co-teaching method to learn from the set of noisy labels, 4) extracting a preferential list of training data based on the two trained neural networks, 5) training a machine learning model with the preferential list of training data, and 6) identifying one or more building footprints in a target image using the trained machine learning model.

Example 2: The computer-implemented method of Example 1, wherein collecting the set of labels may include identifying the training set of images and collecting crowdsourced labels for images in the training set of images.

Example 3: The computer-implemented method of any of Examples 1 and 2, wherein the predetermined degree of noise may include a calculated degree of noise based on crowdsourced labels for a geographic region and/or a manually adjusted degree of noise.

Example 4: The computer-implemented method of any of Examples 1-3, wherein distorting the boundaries of a polygon may include adjusting a scale of the polygon, rotating the polygon, shifting a location of the polygon, and/or skewing a boundary of the polygon.

Example 5: The computer-implemented method of any of Examples 1-4, wherein creating the set of noisy labels may include applying the set of labels to the distorted polygons, removing a portion of the polygons from the training set of images, and/or adjusting a distribution of types of polygons within the training set of images.

Example 6: The computer-implemented method of any of Examples 1-5, wherein training the two neural networks may include training the two neural networks on embeddings of the training set of images, updating a first neural network using training data selected by a second neural network, and updating the second neural network using training data selected by the first neural network.

Example 7: The computer-implemented method of any of Examples 1-6, wherein extracting the preferential list of training data may include evaluating an accuracy of labels for the training set of images and swapping a low accuracy label with a higher accuracy label.

Example 8: The computer-implemented method of any of Examples 1-7, wherein extracting the preferential list of training data may include ranking training data based on a loss function of the co-teaching method and adding training data to the preferential list of training data based on the ranking.

Example 9: The computer-implemented method of any of Examples 1-8 may further include evaluating a predictive accuracy of the two trained neural networks and modifying the two neural networks to improve the predictive accuracy.

Example 10: The computer-implemented method of Example 9, wherein evaluating the predictive accuracy of the two trained neural networks may include calculating an intersection over union metric calculated for image pixels, a precision score, a recall score, and/or an F-score.

Example 11: A corresponding system for automated detection of building footprints may include several modules stored in memory, including 1) a collection module that collects a set of labels that label polygons within a training set of images as architectural structures, 2) a creation module that creates a set of noisy labels with a predetermined degree of noise by distorting boundaries of a number of the polygons within the training set of images, 3) a co-teaching module that simultaneously trains two neural networks by applying a co-teaching method to learn from the set of noisy labels, 4) an extraction module that extracts a preferential list of training data based on the two trained neural networks, 5) a training module that trains a machine learning model with the preferential list of training data, and 6) an identification module that identifies one or more building footprints in a target image using the trained machine learning model. The system may also include one or more hardware processors that execute the collection module, the creation module, the co-teaching module, the extraction module, the training module, and the identification module.

Example 12: The system of Example 11, wherein the collection module may collect the set of labels by identifying the training set of images and collecting crowdsourced labels for images in the training set of images.

Example 13: The system of any of Examples 11 and 12, wherein the predetermined degree of noise may include a calculated degree of noise based on crowdsourced labels for a geographic region and/or a manually adjusted degree of noise.

Example 14: The system of any of Examples 11-13, wherein the creation module may distort the boundaries of a polygon by adjusting a scale of the polygon, rotating the polygon, shifting a location of the polygon, and/or skewing a boundary of the polygon.

Example 15: The system of any of Examples 11-14, wherein the creation module may create the set of noisy labels by applying the set of labels to the distorted polygons, removing a portion of the polygons from the training set of images, and/or adjusting a distribution of types of polygons within the training set of images.

Example 16: The system of any of Examples 11-15, wherein the co-teaching module may train the two neural networks by training the two neural networks on embeddings of the training set of images, updating a first neural network using training data selected by a second neural network, and updating the second neural network using training data selected by the first neural network.

Example 17: The system of any of Examples 11-16, wherein the extraction module may extract the preferential list of training data by evaluating an accuracy of labels for the training set of images and swapping a low accuracy label with a higher accuracy label.

Example 18: The system of any of Examples 11-17, wherein the extraction module may extract the preferential list of training data by ranking training data based on a loss function of the co-teaching method and adding training data to the preferential list of training data based on the ranking.

Example 19: The system of any of Examples 11-18, further including an evaluation module, stored in memory, that evaluates a predictive accuracy of the two trained neural networks and modifies the two neural networks to improve the predictive accuracy.

Example 20: The above-described method may be encoded as computer-readable instructions on a computer-readable medium. For example, a computer-readable medium may include one or more computer-executable instructions that, when executed by one or more processors of a computing device, may cause the computing device to 1) collect a set of labels that label polygons within a training set of images as architectural structures, 2) create a set of noisy labels with a predetermined degree of noise by distorting boundaries of a number of the polygons within the training set of images, 3) simultaneously train two neural networks by applying a co-teaching method to learn from the set of noisy labels, 4) extract a preferential list of training data based on the two trained neural networks, 5) train a machine learning model with the preferential list of training data, and 6) identify at least one building footprint in a target image using the trained machine learning model.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive training images data to be transformed, transform the training images to introduce noise and error, output a result of the transformation to perform a co-teaching method, use the result of the transformation to identify a preferential training dataset, and store the result of the transformation to provide training data for a machine learning model to identify building footprints in satellite images. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   collecting a set of labels that label polygons within a training set of images as architectural structures;
   creating a set of noisy labels with a predetermined degree of noise by distorting boundaries of a number of the polygons within the training set of images;
   simultaneously training two neural networks by applying a co-teaching method to learn from the set of noisy labels;
   extracting a preferential list of training data based on the two trained neural networks;
   training a machine learning model with the preferential list of training data; and
   identifying at least one building footprint in a target image using the trained machine learning model.

2. The method of claim 1, wherein collecting the set of labels comprises:
   identifying the training set of images; and
   collecting crowdsourced labels for images in the training set of images.

3. The method of claim 1, wherein the predetermined degree of noise comprises at least one of:
   a calculated degree of noise based on crowdsourced labels for a geographic region; or
   a manually adjusted degree of noise.

4. The method of claim 1, wherein distorting the boundaries of a polygon comprises at least one of:
   adjusting a scale of the polygon;
   rotating the polygon;
   shifting a location of the polygon; or
   skewing a boundary of the polygon.

5. The method of claim 1, wherein creating the set of noisy labels comprises at least one of:
   applying the set of labels to the distorted polygons;
   removing a portion of the polygons from the training set of images; or
   adjusting a distribution of types of polygons within the training set of images.

6. The method of claim 1, wherein training the two neural networks comprises:
   training the two neural networks on embeddings of the training set of images;
   updating a first neural network using training data selected by a second neural network; and
   updating the second neural network using training data selected by the first neural network.

7. The method of claim 1, wherein extracting the preferential list of training data comprises:
   evaluating an accuracy of labels for the training set of images; and
   swapping a low accuracy label with a higher accuracy label.

8. The method of claim 1, wherein extracting the preferential list of training data comprises:
   ranking training data based on a loss function of the co-teaching method; and
   adding training data to the preferential list of training data based on the ranking.

9. The method of claim 1, further comprising:
   evaluating a predictive accuracy of the two trained neural networks; and
   modifying the two neural networks to improve the predictive accuracy.

10. The method of claim 9, wherein evaluating the predictive accuracy of the two trained neural networks comprises calculating at least one of:
    an intersection over union metric calculated for image pixels;
    a precision score;
    a recall score; or
    an F-score.

11. A system comprising:
    a collection module, stored in memory, that collects a set of labels that label polygons within a training set of images as architectural structures;
    a creation module, stored in memory, that creates a set of noisy labels with a predetermined degree of noise by distorting boundaries of a number of the polygons within the training set of images;
    a co-teaching module, stored in memory, that simultaneously trains two neural networks by applying a co-teaching method to learn from the set of noisy labels;
    an extraction module, stored in memory, that extracts a preferential list of training data based on the two trained neural networks;
    a training module, stored in memory, that trains a machine learning model with the preferential list of training data;
    an identification module, stored in memory, that identifies at least one building footprint in a target image using the trained machine learning model; and
    at least one processor that executes the collection module, the creation module, the co-teaching module, the extraction module, the training module, and the identification module.

12. The system of claim 11, wherein the collection module collects the set of labels by:
    identifying the training set of images; and
    collecting crowdsourced labels for images in the training set of images.

13. The system of claim 11, wherein the predetermined degree of noise comprises at least one of:
    a calculated degree of noise based on crowdsourced labels for a geographic region; or
    a manually adjusted degree of noise.

14. The system of claim 11, wherein the creation module distorts the boundaries of a polygon by at least one of:
adjusting a scale of the polygon;
rotating the polygon;
shifting a location of the polygon; or
skewing a boundary of the polygon.

15. The system of claim 11, wherein the creation module creates the set of noisy labels by at least one of:
applying the set of labels to the distorted polygons;
removing a portion of the polygons from the training set of images; or
adjusting a distribution of types of polygons within the training set of images.

16. The system of claim 11, wherein the co-teaching module trains the two neural networks by:
training the two neural networks on embeddings of the training set of images;
updating a first neural network using training data selected by a second neural network; and
updating the second neural network using training data selected by the first neural network.

17. The system of claim 11, wherein the extraction module extracts the preferential list of training data by:
evaluating an accuracy of labels for the training set of images; and
swapping a low accuracy label with a higher accuracy label.

18. The system of claim 11, wherein the extraction module extracts the preferential list of training data by:
ranking training data based on a loss function of the co-teaching method; and
adding training data to the preferential list of training data based on the ranking.

19. The system of claim 11, further comprising an evaluation module, stored in memory, that:
evaluates a predictive accuracy of the two trained neural networks; and
modifies the two neural networks to improve the predictive accuracy.

20. A non-transitory computer-readable medium comprising one or more computer-executable instructions that, when executed by at least one processor of a computing device, cause the computing device to:
collect a set of labels that label polygons within a training set of images as architectural structures;
create a set of noisy labels with a predetermined degree of noise by distorting boundaries of a number of the polygons within the training set of images;
simultaneously train two neural networks by applying a co-teaching method to learn from the set of noisy labels;
extract a preferential list of training data based on the two trained neural networks;
train a machine learning model with the preferential list of training data; and
identify at least one building footprint in a target image using the trained machine learning model.

* * * * *